(12) United States Patent
Wu et al.

(10) Patent No.: US 8,763,969 B2
(45) Date of Patent: Jul. 1, 2014

(54) FOLDABLE DISPLAY SUPPORT

(75) Inventors: Chen Hao Wu, New Taipei (TW); Kuo Feng Chang, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 294 days.

(21) Appl. No.: 13/405,259

(22) Filed: Feb. 25, 2012

(65) Prior Publication Data

US 2012/0248048 A1   Oct. 4, 2012

(30) Foreign Application Priority Data

Mar. 31, 2011  (TW) .............................. 100111173 A (51) Int. Cl.
| | |
|---|---|
| *E04G 3/00* | (2006.01) |
| *F16M 13/00* | (2006.01) |
| *F16M 11/00* | (2006.01) |
| *H05K 7/16* | (2006.01) |

(52) U.S. Cl.
USPC ................... 248/284.1; 248/421; 248/123.11; 248/162.1; 361/679.06

(58) Field of Classification Search
CPC .............................................. F16M 2200/041
USPC .............. 248/284.1, 421, 123.11, 136, 162.1, 248/372.1; 361/679.06
See application file for complete search history.

(56) References Cited

U.S. PATENT DOCUMENTS

| | | | |
|---|---|---|---|
| 6,581,893 B1 * | 6/2003 | Lu ............................... | 248/291.1 |
| 6,859,356 B2 * | 2/2005 | Chih et al. ............... | 361/679.21 |
| 7,275,286 B2 * | 10/2007 | Lu et al. .......................... | 16/340 |
| 7,370,838 B2 * | 5/2008 | Jeong et al. ................ | 248/125.7 |
| 7,431,254 B2 * | 10/2008 | Cheng ........................ | 248/292.12 |
| 7,604,206 B2 * | 10/2009 | Jung et al. ...................... | 248/133 |
| 7,614,594 B2 * | 11/2009 | Baek et al. .................. | 248/274.1 |
| 7,644,473 B2 * | 1/2010 | Chen et al. ....................... | 16/340 |
| 7,934,689 B2 * | 5/2011 | Chiu et al. ............... | 248/222.11 |
| 7,984,889 B2 * | 7/2011 | Whitley et al. ............... | 248/371 |

* cited by examiner

*Primary Examiner* — Joshua J Michener
*Assistant Examiner* — Chiedu Chibogu
(74) *Attorney, Agent, or Firm* — Guice Patents PLLC (57) ABSTRACT

The present invention provides a foldable display support, wherein when a support arm is in a standing state, a limiting sheet is located in a limiting part of a screen support rack for blocking, so only the forward/backward tilted angle of a screen can be adjusted, thereby preventing being unstable and falling due to the gravity center being overly backward. When the support arm is folded to a horizontal state, the gravity center is lowered, and a protrusion of a first cam abuts a protrusion of a second cam, such that the second cam axially moves and pushes the limiting sheet to be released from the limiting part of the screen support rack, at this moment, the screen is enabled to be backwardly rotated and folded to a horizontal state for reducing the occupied space, thereby ensuring the folding process to be smooth and stable and preventing from falling.

15 Claims, 11 Drawing Sheets

FOLDABLE DISPLAY SUPPORT

BACKGROUND OF THE INVENTION

1. Field of the Invention

The present invention relates to a display support, especially to a support capable of reducing occupied space by folding.

2. Description of Related Art

A liquid crystal display is a commonly seen electronic product in our lives, also a display support has provided with more comprehensive and various functions, such as adjusting the elevation angle, left/right rotating or adjusting height and fastening. A conventional support structure is often equipped with a support arm for connecting a screen support rack and a base, and an upper hinge is used for pivoting the support arm and the screen support rack, a lower hinge is used for pivoting the support arm and the base. As such, the forward/backward tilted angle of the screen fastened on the screen support rack can be adjusted through rotating the upper hinge, and the height of the screen can be adjusted by upwardly/downwardly rotating the support arm through the lower hinge.

For the convenience of storage and package, the screen and the support rack are foldable for reducing the occupied space, a standing support arm can be rotated to a horizontal state through the lower hinge, and the screen can be rotated to a horizontal state through the upper hinge, thereby reducing the whole folded volume. However, when the support arm is in the standing state, the screen is backwardly rotated to be horizontal, at this moment, the screen is located at a higher location, and the gravity center is backwardly moved, which may cause unstable and fall. As such, the present invention is to solve the problem of the screen being unstable and fallen due to the gravity center being backwardly moved while folding the screen at a higher location.

SUMMARY OF THE INVENTION

One primary object of the present invention is to provide a foldable display support, wherein only the forward/backward tilted angle of a screen can be adjusted while a support arm is in a standing state, and the screen cannot be rotated to a horizontal folding state, thereby preventing being unstable and falling due to the gravity center being overly backward. When the support arm is in a folding state, the gravity center is lowered to enable the screen to be rotated and folded to the horizontal state, thereby ensuring the folding process to be smooth and stable and preventing from falling.

Another object of the present invention is to provide a foldable display support, wherein when the support is unlocked and unfolded from a folding state, a screen can be rotated to a specific angle for being positioned, thereby reminding a user the screen has been upwardly rotated to a proper angle for use.

One another object of the present invention is to provide a foldable screen support, wherein when a support arm is rotated and folded to a horizontal state, the support arm can be locked, and the support arm can automatically upwardly unfold after being unlocked.

For achieving the mentioned objects, one technical solution provided by the present invention is to provide a foldable display support, which comprises:

a screen support rack, used for fastening a screen, the bottom of the screen support rack is installed with at least a pivotal rotation part on which a limiting part is provided;

a base, installed with a pivotal connection seat;

a support arm, installed with at least an upper pivotal connection part and at least a lower pivotal connection part, the upper pivotal connection part is pivoted with the pivotal rotation part of the screen support rack through an upper hinge, the lower pivotal connection part is pivoted with the pivotal connection seat of the base through a lower hinge, and a lateral side of the support arm is installed with at least a linkage mechanism for linking the upper hinge and the lower hinge;

the upper hinge includes a core shaft and a first cam, a second cam, a limiting sheet and a first elastic member which are sleeved on the core shaft, the first cam and the second cam respectively have at least a protrusion, the limiting sheet has a block part which mutually blocks with the limiting part of the screen support rack, for limiting the screen to rotate within a first angle range;

when the support arm is rotated through the lower hinge, the linkage mechanism links the first cam to rotate relative to the second cam, when the protrusion of the first cam and the protrusion of the second cam contact and abut against each other, the second cam axially moves and pushes the limiting sheet for enabling the block part of the limiting sheet to be released from the limiting part of the screen support rack, thereby enabling the screen to rotate within a second angle range.

According to one embodiment of the present invention, the first angle range is defined as the range in which the screen can rotate while the support arm being in a standing state, at this moment, the screen cannot be rotated and folded to a horizontal state. The second angle range is defined as the range in which the screen can rotate while the support arm being in a horizontal folding state, at this moment, the screen can be rotated and folded to a horizontal state.

According to the present invention, the upper hinge is provided with a first positioning sheet and a second positioning sheet which can relatively rotate, the first positioning sheet is formed with a positioning slot, the second positioning sheet is installed with a protrusion capable of moving and being positioned in the positioning slot. When the screen is rotated to a specific angle, the protrusion is rotated to be released from the positioning slot, enabling the screen to be folded to the horizontal state. When the screen is upwardly rotated to the specific angle from the folding state, the protrusion is mounted in the positioning slot for being positioned, therefore a user's hand can feel a buckling action to remind the user the screen has been rotated to a proper angle for use.

According to the present invention, a locking mechanism is further provided, a slide zone is formed on the base, the locking mechanism includes a slide member capable of moving in the slide zone, the lower pivotal connection part of the support arm has a protruding block part. When the support arm is in the standing state, the block part is at the bottom end and located in the slide zone for blocking the slide member; when the support arm is rotated to the folding location, the block part is released from the slide zone, and the slide member slides to the bottom of the block part for blocking the block part, so the support arm cannot be upwardly rotated thereby being locked. When the slide member is released from the bottom of the block part for unlocking, the support arm is enabled to automatically and upwardly unfolded through a torsion spring.

BRIEF DESCRIPTION OF THE DRAWINGS

FIG. 8-1 is a schematic view illustrating the operation of adjusting the backward tilted angle, according to the present invention;

FIG. 8-2 is a schematic view illustrating the operation of adjusting the forward tilted angle, according to the present invention;

DETAILED DESCRIPTION OF THE PREFERRED EMBODIMENT

Figure 1:
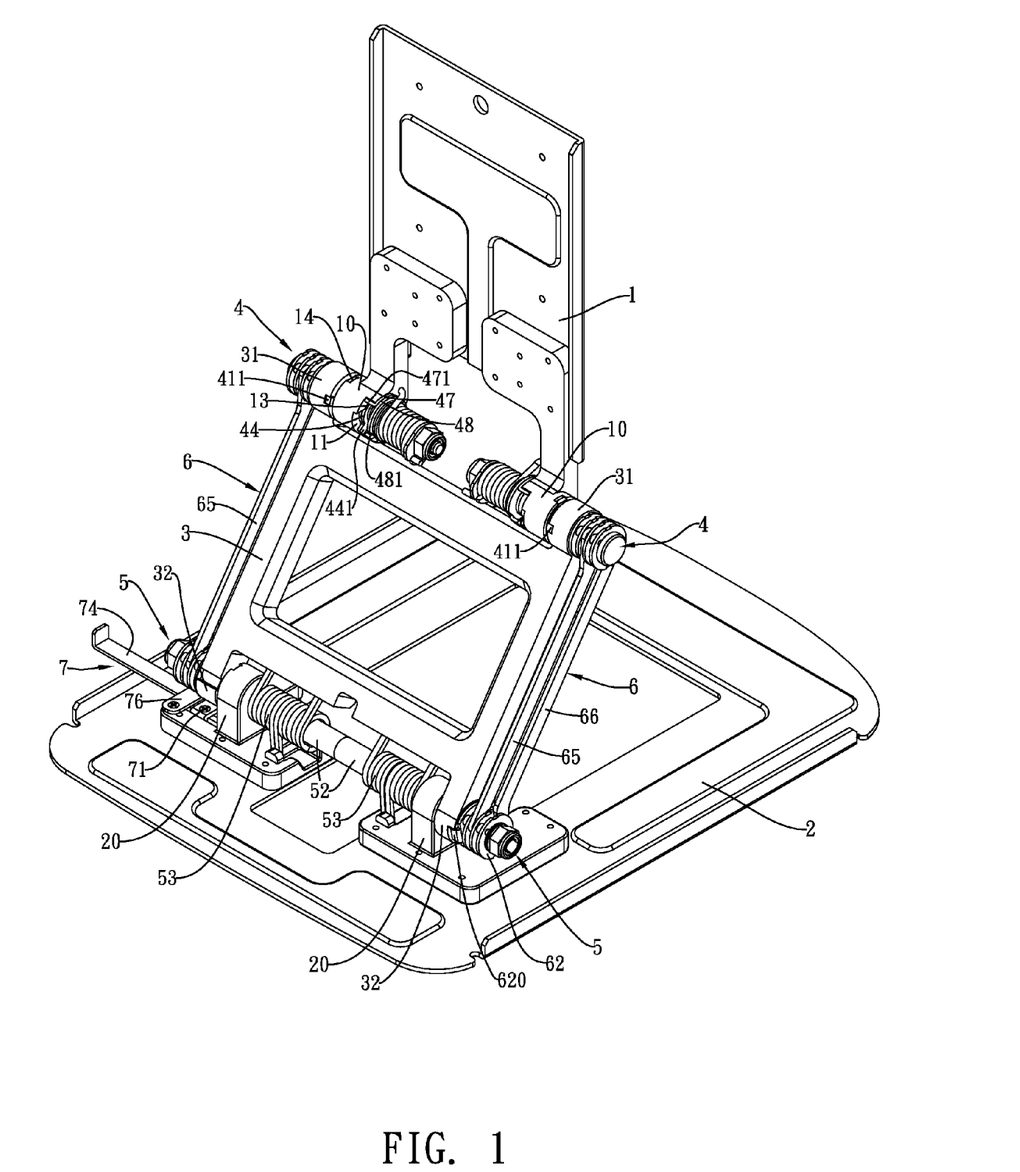
FIG. 1 is a schematic perspective view illustrating the assembly of the present invention.
Figure 2:
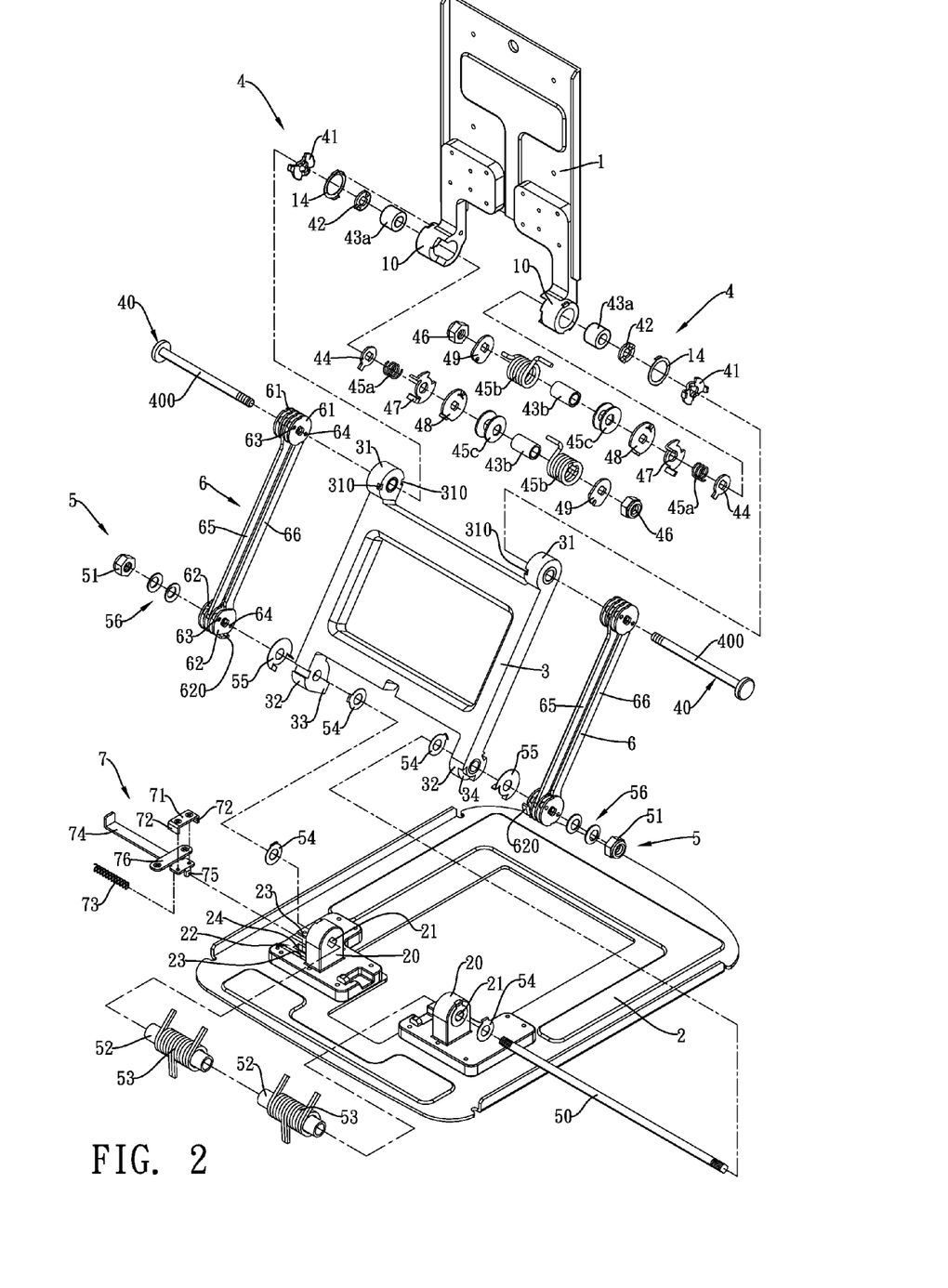
FIG. 2 is a schematic exploded view illustrating the components of the present invention.
Figure 3:
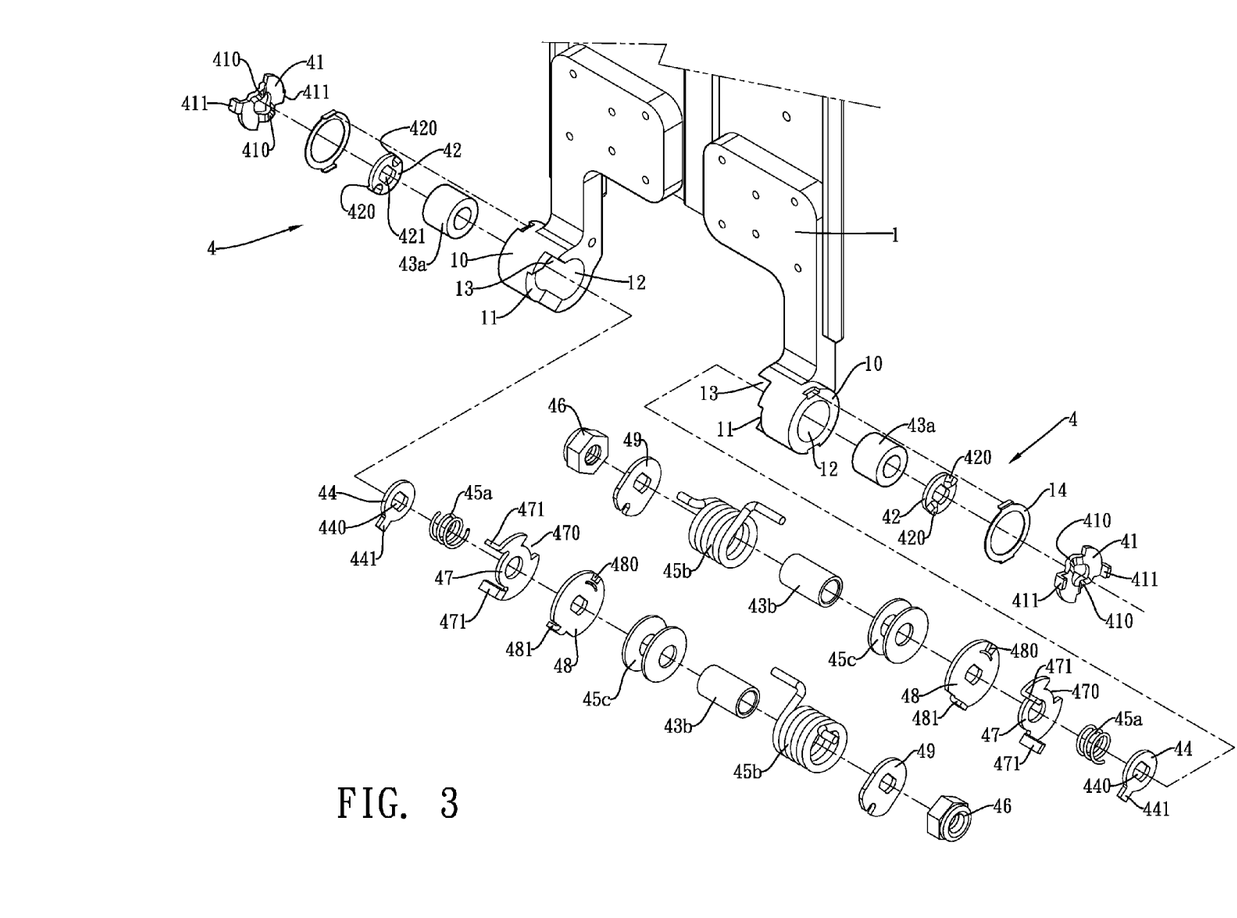
FIG. 3 is a schematic partially enlarged view illustrating a part of the components of the present invention.

Referring from FIG. 1 to FIG. 3, wherein FIG. 1 is a schematic perspective view illustrating the assembly of the present invention; FIG. 2 is a schematic exploded view illustrating the components of the present invention; and FIG. 3 is a schematic partially enlarged view illustrating a part of the components of the present invention. According to the present invention, the foldable display support comprises a screen support rack 1, a base 2, a support arm 3, two upper hinges 4, two lower hinges 5 and two linkage mechanisms 6.

The screen support rack 1 is used for fastening a screen, and two lower lateral ends of the screen support rack 1 are respectively formed with a pivotal rotation part 10 having a limiting part 11. The limiting part 11 is a recess slot, the pivotal rotation part 10 is further formed with a through circular shaft hole 12. The base 2 is installed with two pivotal connection seats 20 which respectively have a noncircular shaft hole 21.

The support arm 3 is installed with an upper pivotal connection part 31 respectively at the two upper ends, and installed with a lower pivotal connection part 32 respectively at the two lower ends. Each upper pivotal connection part 31 is pivoted with the pivotal rotation part 10 of the screen support rack 1 through the upper hinge 4; each lower pivotal connection part 32 is pivoted with the pivotal connection seat 20 through the lower hinge 5. In addition, two lateral sides of the support arm 3 are respectively installed with the linkage mechanisms 6 for linking with the upper hinges 4 and the lower hinges 5. As such, the screen support rack 1 can adjust the frontward/backward tilted angle of the through the upper hinges 4 rotating relative to the support arm 3. And the support arm 3 can be used for adjusting the height of the screen through the lower hinges 5 rotating relative to the base 2, therefore the screen can be downwardly folded.

According to this embodiment of the present invention, the two upper hinges 4, the two lower hinges 5 and the two linkage mechanisms 6 are symmetrically arranged.

Each upper hinge 4 includes a core shaft 40 and a first cam 41, a second cam 42, a first sleeve tube 43a, a limiting sheet 44 and a first elastic member 45a which are sleeved on the core shaft 40, and a distal end of the core shaft 40 is provided with a tightening member 46. The core shaft 40 utilizes a noncircular shaft rod 400 to pass through the linkage mechanism 6, a circular hole on the upper pivotal connection part 31 and the shaft hole 12 of the pivotal rotation part 10 of the screen support rack 1. The first cam 41 and the second cam 42 are capable of relatively rotating, and respectively have two protrusions 410, 420. The first cam 41 is sleeved on the core shaft 40 through a circular hole, and is formed with two positioning pins 411 which can be mounted in two recess slots 310 formed on the upper pivotal connection part 31 of the support arm 3, such that the first cam 41 can synchronously move with the upper pivotal connection part 31. The second cam 42 is sleeved on the shaft rod 400 through a noncircular restraining hole 421, thereby synchronously moving with the core shaft 40. The limiting sheet 44 is sleeved on the shaft rod 400 through a noncircular restraining hole 440, thereby synchronously moving with the core shaft 40, and the limiting sheet 44 has a block part 441 which mutually blocks with the limiting part 11 of the screen support rack 1 for limiting the screen to rotate within a first angle range. The first angle range is defined as the range in which the screen can rotate while the support arm 3 being in a standing state, for example a range of 5 degree of forward tilting to 20 degree of backward tiling. In this embodiment, the limiting part 11 is a recess slot, and the block part 441 is a protrusion. In other embodiments, the limiting part 11 can be a protrusion, and the block part 441 of the limiting sheet 44 is a recess slot.

Figure 4:
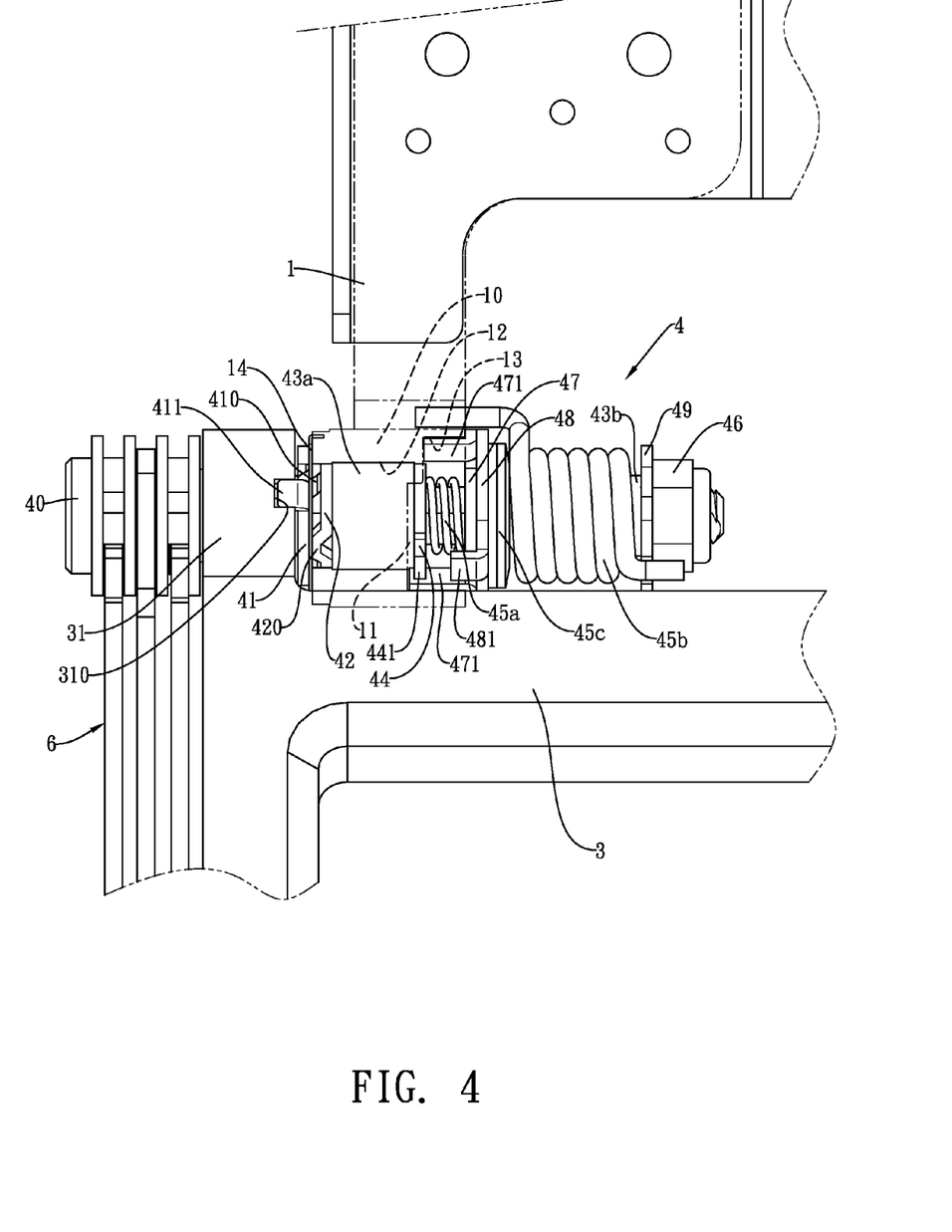
FIG. 4 is a schematic view illustrating the limiting sheet being able to blocking the screen support rack while the support arm being in the standing state, according to the present invention.

Referring to FIG. 4, the first sleeve tube 43a is installed in the shaft hole 12 of the pivotal rotation part 10, two ends thereof are respectively abutted against the second cam 42 and a side of the limiting sheet 44, and the first elastic member 45a is disposed at the other side of the limiting sheet 44, wherein the first elastic member 45a can be a compression spring or an elastic sheet. Moreover, a lateral side of the pivotal rotation part 10 of the screen support rack 1 is combined and fixed with a friction sheet 14. The friction sheet 14 is sleeved on the core shaft 40 and connected with a lateral side of the first cam 41.

When the support arm 3 is in the standing state, the block part 441 of the limiting sheet 44 is located in the limiting part 11 of the screen support rack 1 (as shown FIG. 1 and FIG. 4), when the screen on the screen support rack 1 can be rotated to adjust its forward/backward tilted angle, two ends of the recess slot of the limiting part 11 of the screen support rack 1 blocks the block part 441 of the limiting sheet 44 for limiting the screen to rotate within the first angle range, for example a range of 5 degree of forward tilting to 20 degree of backward tiling.

Figure 5:
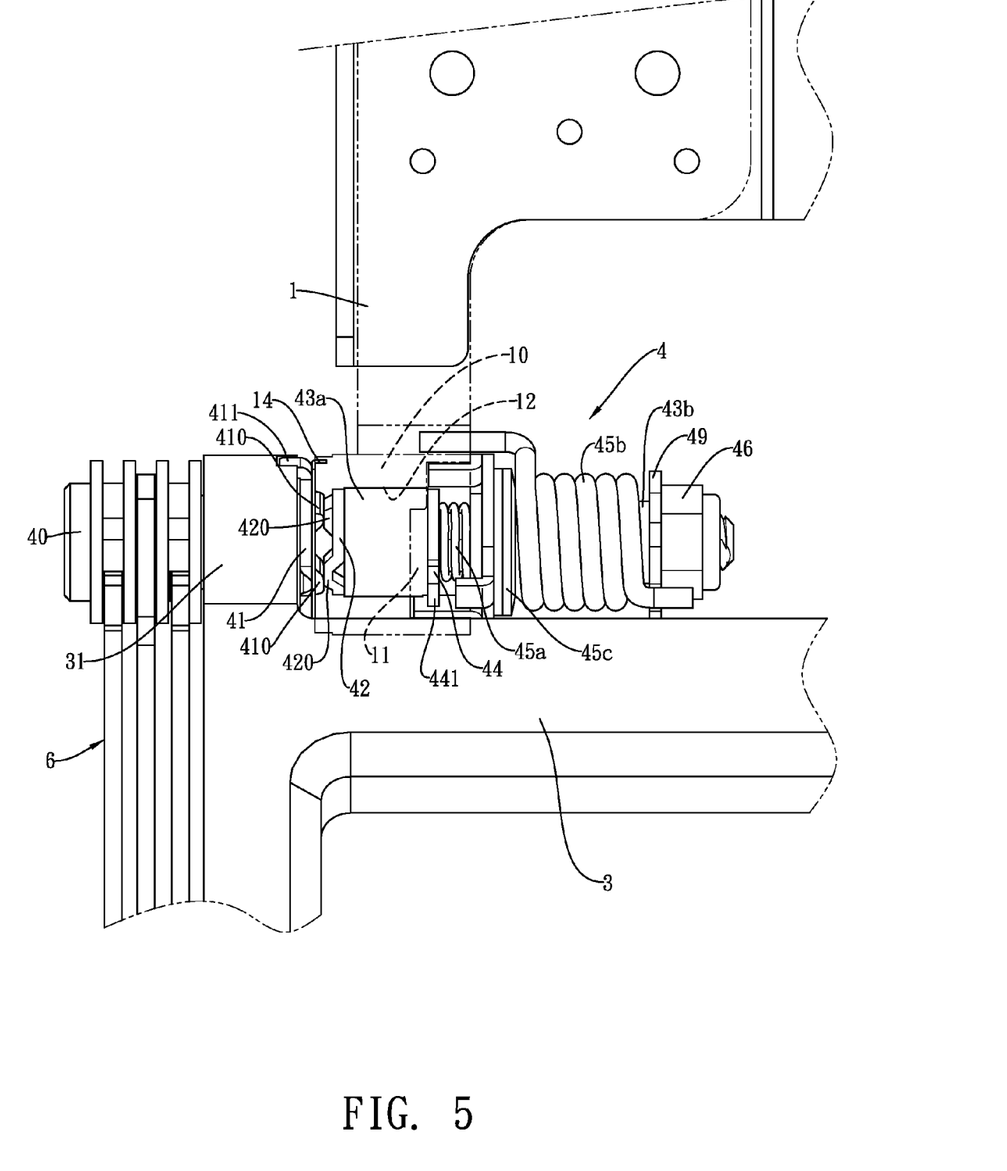
FIG. 5 is a schematic view illustrating the limiting sheet being released from the limiting part of the screen support rack while the support arm being in the folding state, according to the present invention.

When the support arm 3 is downwardly rotated for being folded in a horizontal state, referring to FIG. 5, the core shaft 40 drives the second cam 42 to rotate relative to the first cam 41, the protrusions 420 of the second cam 42 are abutted with the protrusions 410 of the first cam 41, such that the second cam 42 can axially move and push the first sleeve tube 43a, then the first sleeve tube 43a pushes the limiting sheet 44 to axially move and compress the first elastic member 45a, so the block part 441 of the limiting sheet 44 is released from the limiting part 11 of the screen support rack 1 and no longer capable of blocking the screen support rack 1, thereby enabling the screen to rotate within a second angle range, for example a range of 5 degree of forward tilting to backwardly rotating to the horizontal state. As such, when the support arm 3 is in the standing state, the screen is restrained from being rotated to a horizontal folding state, when the support arm 3 is downwardly folded for lowering the gravity center, the screen is then enabled to be rotated to the horizontal folding state, thereby preventing being unstable and falling due to the gravity center being overly backward.

The angle of the support arm 3 being in the upright state or folding state can be determined according to the user's requirements, as such, the standing state is not limited to be vertical or at a specific angle, and the folding state is not limited to be horizontal or 180 degree.

The second cam 42, the first sleeve tube 43a and the limiting sheet 44 can be integrally formed as one unit, or the second cam 42 and the first sleeve tube 43a can be integrally formed as one unit, or the first sleeve tube 43a and the limiting sheet 44 can be integrally formed as one unit. When the whole length is reduced, the first sleeve tube 43a can be saved, and only the second cam 42 and the limiting sheet 44 are provided, or the second cam 42 and the limiting sheet 44 are integrally formed as one unit.

Each upper hinge 4 further includes a first positioning sheet 47 and a second positioning sheet 48. The first positioning sheet 47 is sleeved on the core shaft 40 through a circular hole, and the first positioning sheet 47 is formed with a positioning slot 470, and is bent to form two connection pins 471 engaged and positioned in a notch 13 of the pivotal rotation part 10 of the screen support rack 1, thereby synchronously moving with the screen support rack 1. The first positioning sheet 47 abuts the first elastic member 45a. The second positioning sheet 48 is mounted and fastened on the core shaft 40 through a noncircular restraining hole, thereby synchronously moving with the core shaft 40. The second positioning sheet 48 is formed with a protrusion 480 capable of moving or being positioned in the positioning slot 470 of the first positioning sheet 47. The second positioning sheet 48 is bent to form a connection pin 481 engaged and positioned in the notch 13 of the pivotal rotation part 10 of the screen support rack 1, and stacks on the connection pins 471 of the first positioning sheet 47, wherein one side of the second positioning sheet 48 is provided with a second elastic member 45c.

Each upper hinge 4 further includes a second sleeve tube 43b sleeved on the core shaft 40, and a torsion spring 45b sleeved on the second sleeve tube 43b, and a fastening sheet 49. The fastening sheet 49 is sleeved and fastened on the core shaft 40 through a noncircular restraining hole, thereby synchronously moving with the core shaft 40. Two ends of the torsion spring 45b are respectively fastened on the screen support rack 1 and the fastening sheet 49, such that a torque is generated while the screen support rack is rotating. The second elastic member 45c is disposed between the second sleeve tube 43b and the second positioning sheet 48 and is an elastic sheet.

The lower hinges 5 utilize a core shaft 50 to pass through the two pivotal connection seats 20 of the base 2, the two lower pivotal connection parts 32 of the support arm 3 and the linkage mechanisms 6, and two ends of the core shaft 50 are respectively installed with a tightening member 51. The core shaft 50 is a noncircular shaft rod. Each lower hinge 5 further includes a sleeve tube 52 sleeved on the core shaft 50, a torsion spring 53 is sleeved on the sleeve tube 52, wherein one end of the torsion spring 53 is fastened on the base 2, the other end thereof is fastened on the support arm 3, such that the support arm 3 is enabled to automatically rotate and stand relative to the base 2. The lower hinge 5 is provided with plural friction pads 54, a positioning pad 55 and an elastic sheet 56 which are sleeved on the core shaft 50.

Each linkage mechanism 6 is a four-rod linkage mechanism, which includes plural upper linkage disks 61, plural lower linkage disks 62, wherein a first fastening shaft 63 and a second fastening shaft 64 are installed between the plural upper linkage disks 61, a first fastening shaft 63 and a second fastening shaft 64 are installed between the plural lower linkage disks 62. Two ends of a first connection rod 65 are respectively pivoted on the first fastening shaft 63 of the upper linkage disks 61 and the first fastening shaft 63 of the lower linkage disks 62. Two ends of at least a second connection rod 66 are respectively pivoted on the second fastening shaft 64 of the upper linkage disks 61 and the second fastening shaft 64 of the lower linkage disks 62. Each upper linkage disk 61 is sleeved and fastened on the shaft rod 400 of the core shaft 40 of the upper hinge 4 through a noncircular hole, thereby synchronously moving with the core shaft 40. Each lower linkage disk 62 is sleeved and fastened on the core shaft 50 of the lower hinge 5 through a noncircular hole, thereby being fixed and not moveable on the core shaft 50. One of the plural lower linkage disks 62 is provided with a protruding stop block 620 capable of blocking a limiting slot 34 of the lower pivotal connection part 32 of the support arm 3, so with two ends of the limiting slot 34 being blocked by the stop block 620, the folding/unfolding angle of the support arm 3 can be limited. The positioning pad 55 is disposed between the lower pivotal connection part 32 and the lower linkage disks 62, and is bent to form two connection pins engaged and positioned in the limiting slot 34.

The linkage mechanism 6 is not limited to the four-rod linkage mechanism, the arrangement of the linkage mechanism 6 can also be belts and pulleys, or chains and gears for linking the upper hinge 4 and the lower hinge 5, thereby enabling the first cam 41 and the second cam 42 to relatively rotate.

Figure 6:
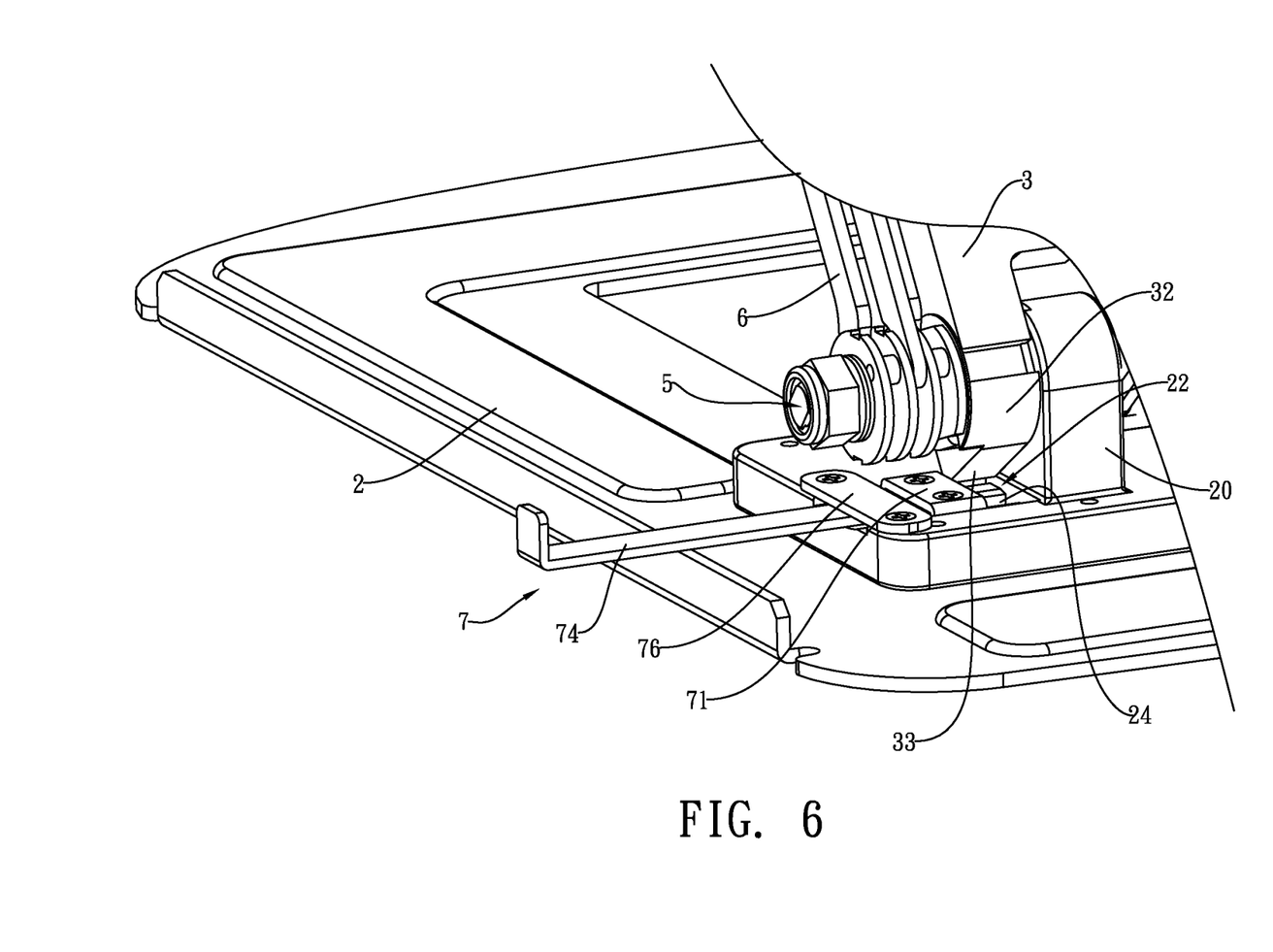
FIG. 6 is a schematic view illustrating the locking mechanism while the support arm being in the standing state, according to the present invention.

According to the present invention, a locking mechanism 7 is further provided, as shown in FIG. 2 and FIG. 6, the base 2 is installed with a slide zone 22 having two ends being respectively formed with a recessed slot groove 23; the locking mechanism 7 includes a slide member 71 slidable in the slide zone 22, two ends of the slide member 71 are bent to form slide sheets 72 moveably inserted in the slide grooves 23 thereby being moveable in the slide grooves 23. An accommodation slot 24 is formed between the two slide grooves 23, and a spring 73 is disposed in the accommodation slot 24. In addition, a pull rod 74 is provided and fastened with the slide member 71, one end of the pull rod 74 is bent to form a block sheet 75 which is received in the accommodation slot 24 and used for compressing the spring 73. The top end of the pull rod 74 is installed with a press board 76 fastened on the base 2, so the pull rod 74 is moveable between the base 2 and the press board 76, and the slide member 71 and the pull rod 74 are moveable in the slide zone 22.

Figure 7:
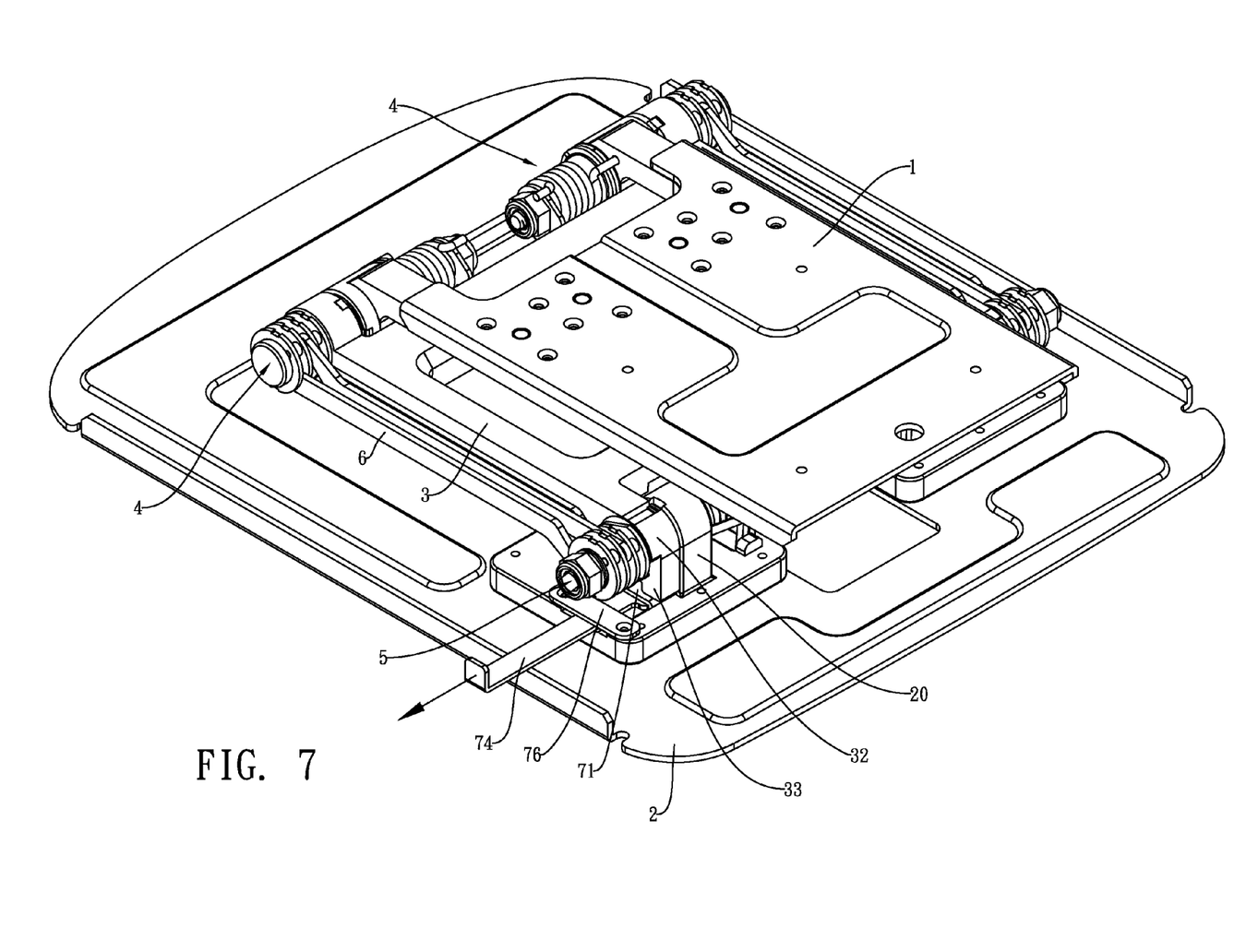
FIG. 7 is a schematic view illustrating the whole support being folded, according to the present invention.

The lower pivotal connection part 32 of the support arm 3 has a protruding block part 33, when the support arm 3 is in the standing state, the block part 33 is at the bottom end and located in the slide zone 22 for blocking the slide member 71, and the block sheet 75 at the front end of the pull rod 74 compresses the spring 73. Referring to FIG. 7, when the support arm 3 is rotated to a horizontal folding location, the block part 33 is rotated for being released from the slide zone 22, and the block sheet 75 is pushed by the spring 73, meanwhile and the pull rod 74 and the slide member 71 are pushed to slide to the bottom of the block part 33 for blocking the block part 33, such that the support arm 3 is unable to be upwardly rotated thereby being locked. When the support arm 3 is desired to be unfolded and unlocked, pulling the pull rod 74 to allow the slide member 71 to move and be released from the block part 33 for achieving the unlocking, thus the support arm 3 automatically and upwardly unfolds and stands through the torsion spring 53 of the lower hinge 5.

With the structure, when the screen is in the standing state for use, the block part 441 of the limiting sheet 44 is located in the limiting slot 11 of the screen support rack 1, as shown in FIG. 1 and FIG. 4. The forward/backward tilted angle of the screen can only be adjusted within the first angle range, for example the range of 5 degree of forward tilting to 20 degree of backward tiling, and cannot be rotated to a horizontal state, thereby preventing being unstable and falling due to the gravity center being overly backward, as shown in FIG. 8-1 and FIG. 8-2. As such, a user has to lower the height of the screen, at this moment the support arm 3 is downwardly rotated, and the linkage mechanism 6 links the core shaft 40 of the upper hinge 4 to rotate relative to the upper pivotal connection part 31, meanwhile links the second cam 42 to rotate relative to the first cam 41 which is fastened on the upper pivotal connection part 31; when the protrusions 420 of the second cam 42 contact and clime on the protrusions 410 of the first cam 41, as shown in FIG. 5, the second cam 42 is pushed to axially move and push the first sleeve tube 43a, then the first sleeve tube 43a pushes the limiting sheet 44 to axially move, so the block part 441 is released from the limiting slot 11 of the screen support rack 1 and compresses the first elastic member 45a, thereby enabling the screen support rack 1 to rotate within the second angle range. At the same time, the support arm 3 is rotated and folded for being horizontal, and the screen support rack 1 can be backwardly rotated to the horizontal folding state, as shown in FIG. 7.

When the support arm 3 is horizontally folded, the block part 33 of the lower pivotal connection part 32 also rotates to be released from the slide zone 22 of the base 2 and no longer blocks the slide member 71, so the slide member 71 is recovered to the bottom of the block part 33 through the spring 73 for blocking the block part 33, therefore the support cam 3 is not able to be upwardly rotated thereby being locked. When the screen is desired to be used, pushing the pull rod 74 to allow the slide member 71 to slide and be released from the block part 33, so the support arm 3 can be rotated and capable of automatically rotating and standing through the torsion spring 53.

Figure 9:
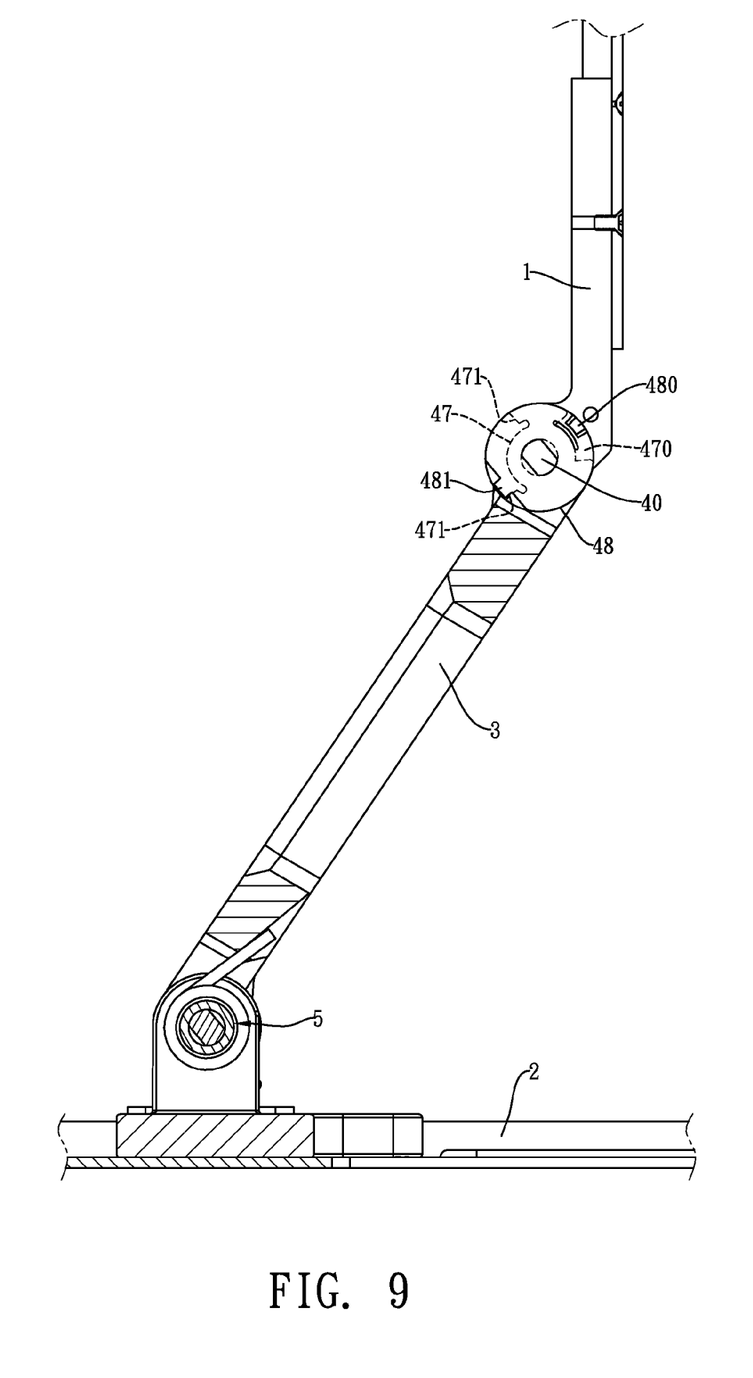
FIG. 9 is a schematic view illustrating the first positioning sheet and the second positioning sheet while the present invention being in the unfolding state.
Figure 10:
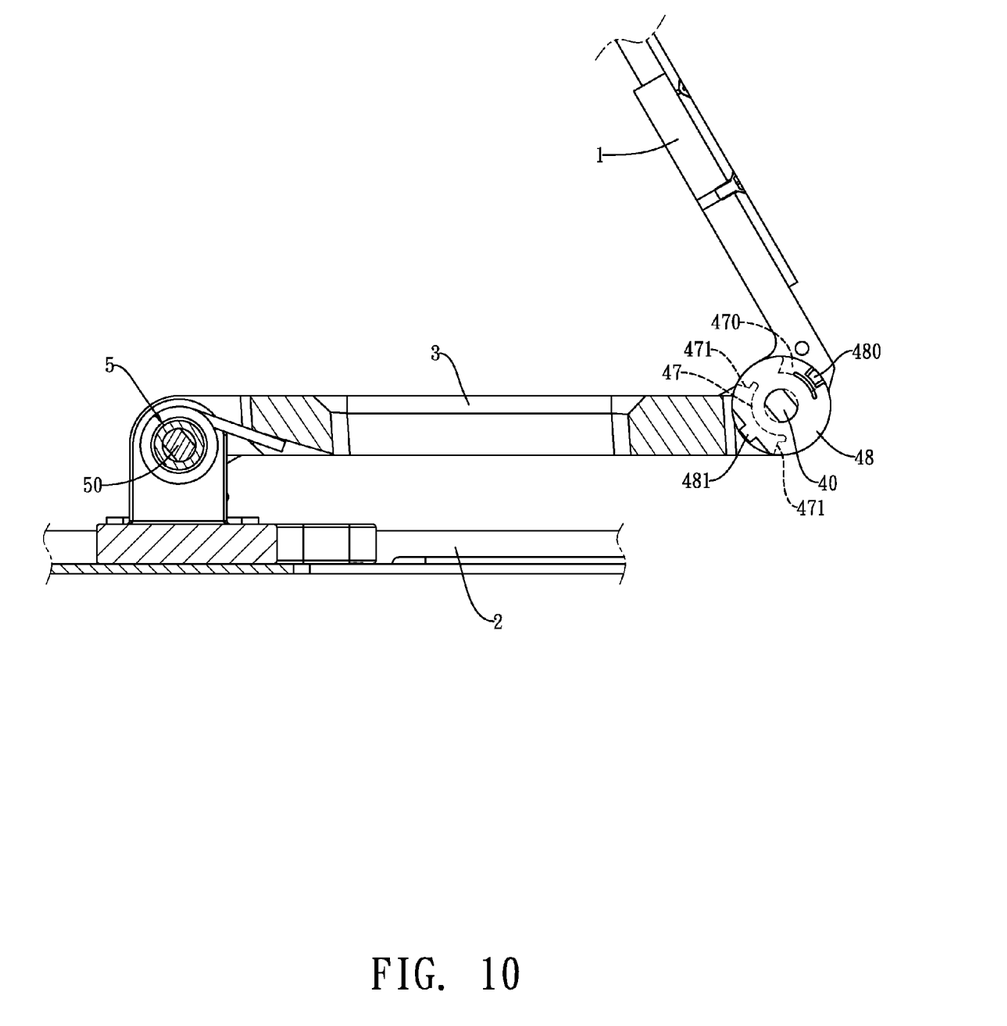
FIG. 10 is a schematic view illustrating the screen support rack being rotated from the horizontal folding state and being positioned at a proper angle for use, according to the present invention.
Figure 81:
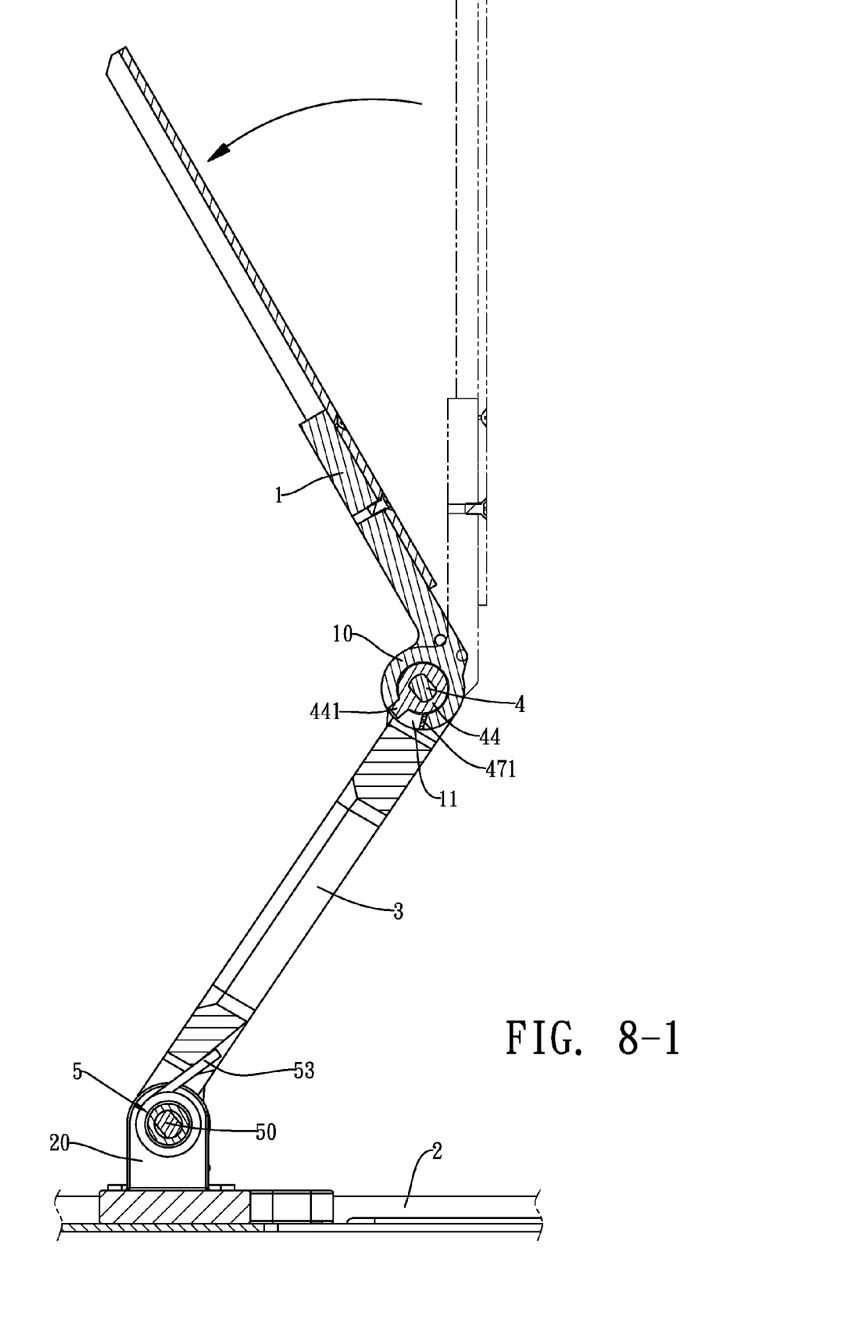
Figure 82:
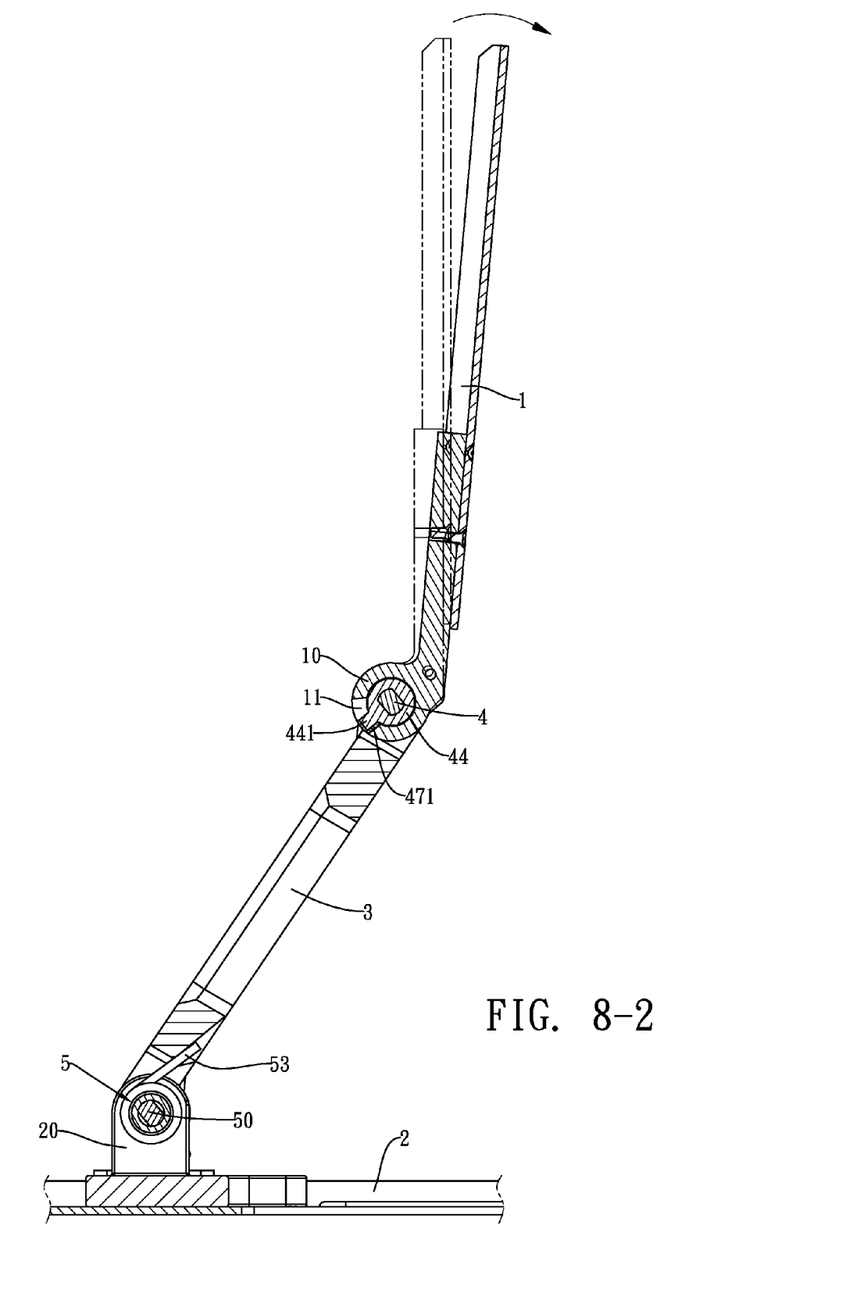

Referring to FIG. 9 and FIG. 10, when the screen is backwardly rotated relative to the core shaft 40, the first positioning sheet 47 fastened on the screen support rack 1 rotates relative to the second positioning sheet 48 fastened on the core shaft 40, and when about backwardly rotates 30 degree, one end of the positioning slot 470 blocks the protrusion 480. If further downwardly rotating through greater forces, the protrusion 480 can be rotated and released from the positioning slot 470, and connected to a lateral side of the first positioning sheet 47, the second positioning sheet 48 axially moves and compresses the second elastic member 45c. At this moment, the screen can be further rotated to horizontal. When the screen is upwardly rotated from the horizontal folding position, the screen support rack 1 drives the first positioning sheet 47 to rotate relative to the second positioning sheet 48, and when the screen backwardly rotates about 30 degree, the positioning slot 470 is rotated to the location of the protrusion 480, and the second positioning sheet 48 axially moves through being pushed by the elastic force of the second elastic member 45c, so the protrusion 480 is pushed back and buckled in the positioning slot 470, at this moment the user's hand can feel a buckling action to remind the user the screen has been rotated to a proper angle for use.

As what is disclosed above, when the support arm of the present invention is in the standing state, the screen cannot be rotated to the horizontal folding state; when the support arm is folded to the horizontal state, the gravity center is lowered to enable the screen to be rotated and folded to the horizontal state, so during the folding process, falling caused by inappropriate operation can be avoided thereby achieving the object of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A foldable display support for a screen, comprising:
   a screen support rack, used for fastening said screen, the bottom of said screen support rack being installed with at least a pivotal rotation part on which a limiting part being provided;
   a base, installed with a pivotal connection seat;
   a support arm, installed with at least an upper pivotal connection part and at least a lower pivotal connection part, said upper pivotal connection part being pivoted with said pivotal rotation part of said screen support rack through an upper hinge, said lower pivotal connection part being pivoted with said pivotal connection seat of said base through a lower hinge, and a lateral side of said support arm being installed with at least a linkage mechanism for linking said upper hinge and said lower hinge;
   said upper hinge including a core shaft, and a first cam, a second cam, a limiting sheet and a first elastic member being sleeved on said core shaft, said first cam and said second cam respectively having at least a protrusion, said limiting sheet having a block part mutually blocking with said limiting part of said screen support rack, for limiting the screen support rack to rotate within a first angle range;
   when said support arm being rotated through said lower hinge, said linkage mechanism linking said first cam to rotate relative to said second cam, when said protrusion of said first cam and said protrusion of said second cam contacting and abutting against each other, said second cam axially moving and pushing said limiting sheet for enabling said block part of said limiting sheet to be released from said limiting part of said screen support rack, thereby enabling said screen support rack to rotate within a second angle range;
   wherein a first sleeve tube is disposed between said second cam and said limiting sheet, said first sleeve tube is sleeved on said core shaft, and two ends of said first sleeve tube are respectively abutted said second cam and one side of said limiting sheet, said first elastic member is disposed at the other side of said limiting sheet.

2. The foldable display support as claimed in claim 1, wherein said limiting part of said screen support rack is a recess slot, and said block part is a protrusion.

3. The foldable display support as claimed in claim 1, wherein said first angle range is defined as the range in which said screen support rack being able to rotate while said support arm being in a standing state; said second angle range is defined as the range in which said screen support rack being able to rotate while said support arm being in a folding state.

4. The foldable display support as claimed in claim 1, wherein a lateral side of said pivotal rotation part of said screen support rack is fixedly connected with a friction sheet connected with a lateral side of said first cam.

5. The foldable display support as claimed in claim 1, wherein said core shaft has a noncircular shaft rod, said pivotal rotation part of said screen support rack is formed with a circular shaft hole, said shaft rod is received in said shaft hole.

6. The foldable display support as claimed in claim 5, wherein said first cam is sleeved on said shaft rod through a circular hole, and at least a positioning pin is mounted in at least a recess slot of said upper pivotal connection part of said support arm; said second cam is sleeved on said shaft rod through a noncircular restraining hole thereby synchronously moving with said core shaft.

7. The foldable display support as claimed in claim 5, wherein said upper hinge includes a first positioning sheet, a second positioning sheet and a second elastic member sleeved on said shaft rod, and said first positioning sheet rotates relative to said second positioning sheet, said first positioning sheet is formed with a positioning slot, said second positioning sheet is installed with a protrusion capable of moving and being positioned in said positioning slot of said first positioning sheet.

8. The foldable display support as claimed in claim 7, wherein said first positioning sheet is sleeved on said core shaft through a circular hole, said first positioning sheet is bent to form two connection pins engaged and positioned in a notch of said pivotal rotation part of said screen support rack; said second positioning sheet is sleeved on said shaft rod of said core shaft through a noncircular restraining hole thereby synchronously moving with said core shaft, said second positioning sheet is bent to form a connection pin engaged and positioned in said notch of said pivotal rotation part of said screen support rack.

9. The foldable display support as claimed in claim 7, wherein another side of said first positioning sheet abuts said first elastic member, another side of said second positioning sheet abuts said second elastic member.

10. The foldable display support as claimed in claim 1, wherein said core shaft is provided with a second sleeve tube sleeved thereon, a torsion spring sleeved on said second sleeve tube, and a fastening sheet, two ends of said torsion spring are respectively fastened on said screen support rack and said fastening sheet.

11. The foldable display support as claimed in claim 5, wherein said lower hinge includes a core shaft having a noncircular shaft rod, said pivotal connection seat of said base is formed with a noncircular shaft hole, said core shaft passes through said shaft hole and a circular hole formed on said lower pivotal connection part of said support arm; said linkage mechanism is a four-rod linkage mechanism, and includes plural upper linkage disks, plural lower linkage disks, a first fastening shaft and a second fastening shaft are installed between said upper linkage disks, a first fastening shaft and a second fastening shaft are installed between said lower linkage disks; two ends of a first connection rod are respectively pivoted on said first fastening shaft of said upper linkage disks and said first fastening shaft of said lower linkage disks; two ends of at least a second connection rod are respectively pivoted on said second fastening shaft of said upper linkage disks and said second fastening shaft of said lower linkage disks; each upper linkage disk is sleeved and fastened on said shaft rod of said upper hinge through a noncircular hole, each lower linkage disk is sleeved and fastened on said shaft rod of said lower hinge through a noncircular hole.

12. The foldable display support as claimed in claim 11, wherein said lower linkage disk is provided with a protruding stop block capable of blocking a limiting slot of said lower pivotal connection part of said support arm; a positioning pad is disposed between said lower pivotal connection part and said lower linkage disk, and is bent to form two connection pins engaged and positioned in said limiting slot.

13. The foldable display support as claimed in claim 1, wherein said base is installed with a slide zone and a locking mechanism, said slide zone is formed with an accommodation slot, said locking mechanism includes a slide member slidable in said slide zone, a spring and a pull rod, said slide member is fastened with said pull rod, said spring is disposed in said accommodation slot, one end of said pull rod is bent to form a block sheet which is disposed in said accommodation slot for compressing said spring.

14. The foldable display support as claimed in claim 13, wherein the top end of said pull rod is installed with a press board fastened on said base.

15. The foldable display support as claimed in claim 13, wherein said lower pivotal connection part of said support arm has a protruding block part, when said support arm is in the standing state, said block part is at the bottom end and located in said slide zone for blocking said slide member; when said support arm is rotated to a folded position, said block part is rotated for being released from said slide zone, and said slide member slides to the bottom of said block part for blocking said block part thereby being locked.

* * * * *